United States Patent

Shellenbarger et al.

[11] Patent Number: 5,947,443
[45] Date of Patent: *Sep. 7, 1999

[54] PLUG VALVE

[75] Inventors: Thomas R. Shellenbarger, Rew; Charles J. Glover, Bradford, both of Pa.

[73] Assignee: Dresser Industries, Inc., Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/947,549

[22] Filed: Oct. 11, 1997

Related U.S. Application Data

[63] Continuation of application No. 08/653,320, May 24, 1996, abandoned.

[51] Int. Cl.⁶ .................................................. F16K 5/18
[52] U.S. Cl. ........................................... 251/181; 251/214
[58] Field of Search ................................. 251/181, 309, 251/312, 214

[56] References Cited

U.S. PATENT DOCUMENTS

| | | | |
|---|---|---|---|
| 2,418,404 | 4/1947 | Greenlee | 251/3 R |
| 3,130,952 | 4/1964 | Meyer | 251/181 X |
| 3,186,680 | 6/1965 | Pool | 251/309 X |
| 3,237,642 | 3/1966 | Tomson | 251/312 X |
| 3,360,236 | 12/1967 | Hulslander | 251/184 |
| 3,647,181 | 3/1972 | Hulslander | 251/317 |
| 3,765,646 | 10/1973 | Hulslander et al. | 251/183 |
| 3,806,087 | 4/1974 | Hulslander | 251/309 |
| 4,379,557 | 4/1983 | Saka | 251/214 X |
| 4,744,390 | 5/1988 | Henry | 137/797 |
| 4,794,944 | 1/1989 | Henry | 137/312 |
| 4,809,949 | 3/1989 | Rakieski | 251/310 |
| 4,892,320 | 1/1990 | Tückmantel | 251/214 X |

FOREIGN PATENT DOCUMENTS

| | | | |
|---|---|---|---|
| 231776 | 2/1964 | Austria | 251/214 |
| 469878 | 3/1952 | Italy | 251/181 |

*Primary Examiner*—John Fox
*Attorney, Agent, or Firm*—Daniel Rubin

[57] ABSTRACT

A gas distribution valve including a body defining an inlet and an outlet passage, a central well containing a cylindrical plug disposed for arcuate displacement therein and including a transverse thru-bore that can be rotated into and out of axial alignment with the flow passages of said body for opening and closing the valve respectively. Overmolded elastomeric seat seals are provided for superior sealing that are urged against the well walls by an arcuate leaf spring intervening between the seals and the plug and extending in a direction concentric with the plug. A cover plate secures the plug within in the well and there is afforded a fire seal ring providing bi-directional contact sealing operative to restrict gas flow during and after exposure to fire or other high temperature environment.

15 Claims, 4 Drawing Sheets

PLUG VALVE

This application is a continuation of application Ser. No. 08/653,320, filed May 24, 1996, now abandoned.

FIELD OF THE INVENTION

The field of art to which the invention pertains includes the art of plug valves utilized in a piping system for controlling flow of fluid line content.

BACKGROUND OF THE INVENTION

Valves of the type to which the invention is directed are sometimes termed "meter and curb valves" or "plug valves" and have been commercially available for many years. They have been widely utilized in pipeline flow containing natural gas or other fluid substances. A common construction, employs a tapered plug valve arcuately operable in a conical body well. A biasing member such as a spring or the like forces the plug axially downward within the well. The body includes inlet and outlet passages separated by the well. For purposes of regulating flow, the plug includes a lateral thru-port alignable with the body passages. Valve operation comprises arcuately displacing the plug to either align or offset the thru-port of the plug with respect to the axis of the body flow passages. Exemplifying such valves are the disclosures of U.S. Pat. Nos. 3,360,236 and 3,806,087.

While such valves have functioned well, they are generally characterized as not being cost effective from the standpoint of manufacturing costs, are not inherently fire resistant, have less than optimum flow characteristics, tend to have higher than anticipated operating costs and require a modest amount of lubrication over the operating life of the valve.

OBJECTS OF THE INVENTION

It is therefore an object of the invention to provide a novel gas distribution valve that is increasingly cost effective to manufacture compared to similar purpose valves of the prior art.

It is a further object of the invention to effect the previous object in a gas distribution valve of relatively smaller size than heretofore without sacrifice in flow capacity characteristics.

It is a still further object of the invention to effect the previous objects with a valve operably characterized to restrict leakage of flow in response to a high temperature exposure or fire condition.

SUMMARY OF THE INVENTION

This invention relates to a novel construction for a gas distribution valve. More specifically, the invention hereof relates to a cost effective construction for a gas distribution valve while affording attributes not previously contained in like valves of the prior art.

The foregoing is achieved in accordance with the invention by a gas distribution valve having a relatively smaller body mass per unit size while defining inlet and outlet passages separated by a central well. An arcuately displaceable cylindrical plug is disposed in the well and includes a transverse bore that can be arcuately displaced ninety degrees into and out of alignment with the body flow passages for opening and closing the valve respectively.

Over-molded elastomeric seat seals supported by the plug afford superior sealing and are biased outward by a leaf spring extending arcuately in a direction concentric with the plug. The spring in this relationship affords enhanced sealing by the seat seals against leakage in the closed position of the valve. A friction ring enables relatively low displacement torques for the plug while a fire sealing ring provides a bi-directional seal operative to restrict leakage flow outward of the bonnet following exposure to fire or other high temperature environment.

The above noted features and advantages of the invention as well as other superior aspects thereof will be further appreciated by those skilled in the art upon reading the detailed description that follows in conjunction with the drawings.

BRIEF DESCRIPTION OF THE DRAWINGS

FIG. 3A is a fragmentary enlargement of the encircled portion 3A of FIG. 3;

DESCRIPTION OF THE PREFERRED EMBODIMENT

Figure 1:
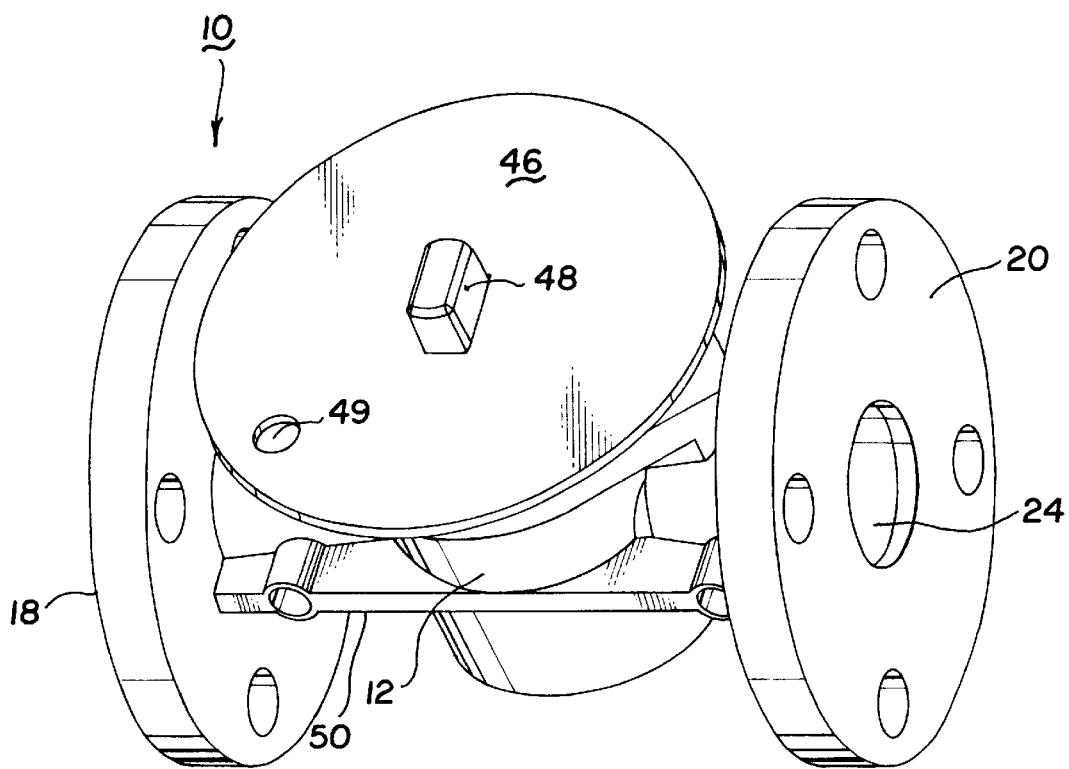
FIG. 1 is a top perspective view of a gas distribution valve in accordance with the invention.
Figure 2:
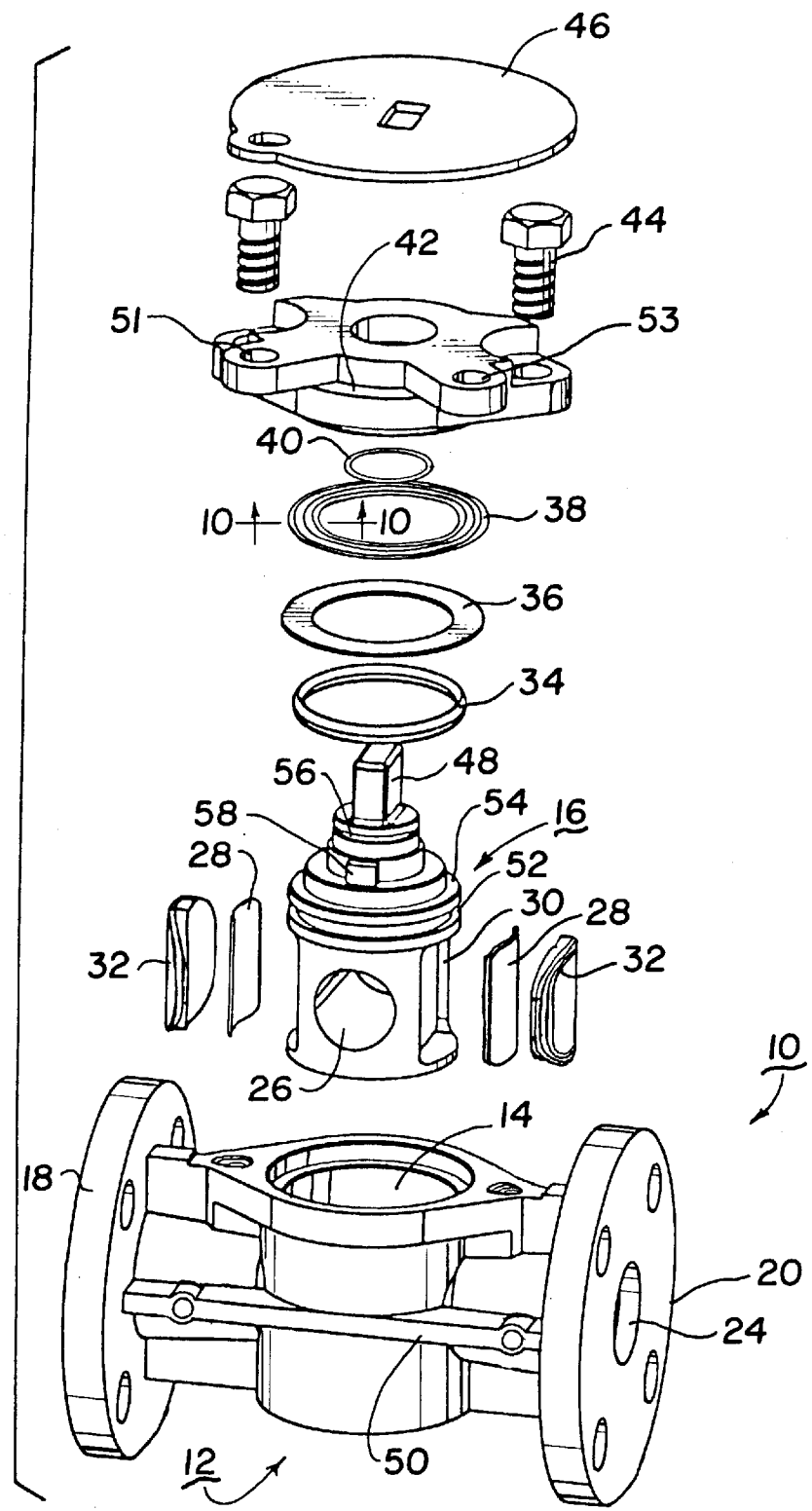
FIG. 2 is an exploded elevation view of the valve of FIG. 1.

In the description which follows, like parts are marked throughout the specification and drawings with the same reference numerals respectively. The drawing figures are not necessarily to scale and in certain views, parts may have been exaggerated for purposes of clarity.

Referring now to the drawings, the valve hereof is designated 10 and is comprised of a body 12 containing a centrally located cylindrical well 14 for receipt of an arcuately displaceable cylindrical plug 16. Opposite flanges 18 and 24 enable installation into a piping system with which the valve is to be utilized. Optionally, the flanges can be omitted and the ends adapted for welding or threading.

Transversely communicating inward through flange 18 is an inlet passage 22 terminating in an inlet port at well 14 whereas communicating outward from outlet port 25 to flange 20 is an outlet passage 24. Within plug 16 is a transverse thru-port 26 which when axially aligned between inlet 22 and outlet 24 places the valve in the "open" position whereas when offset ninety degrees with respect thereto places the valve in the "closed" position. For reasons as will be explained, the diameters and geometric configuration of ports 23 and 25 are the same as that of thru-port 26.

Supported on or about plug 16 are opposite arcuate leaf springs 28 to be received in opposite plug recesses 30 and a seat pad 32 likewise received in recess 30 behind spring 28.

Pad 32, as will be further explained, seals against leakage when the plug is in its closed position. Also supported on plug 16 is a primary gas seal 34, a friction ring 36, a concentrically rippled or corrugated stainless steel fire seal 38, and a weather seal 40 all of which are secured in place by a cover plate 42 secured via bolts 44 to body 12. A locking plate 46 positioned over the wrench stem 48 of the plug enables the open or closed positions of the valve to be set and secured by a bullet lock (not shown) inserted in plate aperture 49 and extending through one of lobe apertures 51 or 53.

Body 12 is preferably comprised of cast ductile iron or steel and in order to reduce the amount of metal mass otherwise required for maintaining strength includes a longitudinal rib 50 extending between outer flanges 18 and 20. Stem or plug 16 is likewise preferably of cast ductile iron or steel formed essentially of cylindrical configuration for receipt within cylindrical well 14. Comprising the plug are vertical recesses 30 on opposite surfaces ninety degree offset from the axis of thru-port 26 for receipt of spring 28 and seat pad 32. Above the thru-port, the plug includes an annular recess 52 in which to receive primary gas seal 34 and a shoulder 54 on which to receive friction ring 36 and fire seal 38. Annular recess 56 receives weather seal 40 and serves to prevent water entry into the valve and thereby prevent the possibility of freezing and/or corrosion as might otherwise occur. Lateral stub 58 serves to engage ninety degree stops (not shown) on the underside of top plate 42 for limiting arcuate displacement of the plug between open and closed positions.

Comprising the valve seats hereof for effecting a gas tight seal with the plug in the closed position, are the seat pads 32 comprised of a moon shape arcuate metal segment 60 onto which a high tensile strength elastomer 62 such as urethane or rubber has been molded on its backside. The elastomer for this purpose includes continuous and parallel ribs 64 and 66 adjacent its peripheral edge. The elastomer seals, likewise eliminate the prior art use of grease for lubrication and seal enhancement. Positioned intervening between each seat pad and the inner surface 72 of recess 30 is arcuate leaf spring 28 arranged concentrically with respect to the axis of plug 16 and having radial feet 68 and 70 that seat against inner recess surface 72. When installed and operative, spring 28 is compressed inwardly so as to urge the seat pads 32 outwardly.

The seat pad 32 is dimensioned both arcuately and in height sufficient when installed to span the inlet and outlet ports 23 and 25 thereat. The elastomeric ribs 64 and 66, with the plug in its closed relation, will thereby be urged outward by compressed spring 28 to engage the wall surface of well 14 thereabout for effecting a closure seal. In the course of the stem being rotated ninety degrees for opening of the valve, seal pads 32 will ride in recesses 30 in the course of plug displacement without separating from the wall surface of well 14.

The selected radius on the back of seat pad 32 being urged by spring 28 against the well surface is oriented concentrically with respect to the well surface allowing a lower profile and a more economical design in that, cylindrical well 14 and plug 16 can be smaller for a given flow requirement. At the same time by virtue of the venturi cross section of the inlet and outlet passages communicating thereat, a greater flow efficiency of more flow or at least the same flow through a smaller valve if effected. That is, the venturi design of inlet 22 has the effect of reducing pressure drop such that with an inlet port 23 that matches thru-port 26 in size, greater flow than otherwise is effected.

Figure 3:
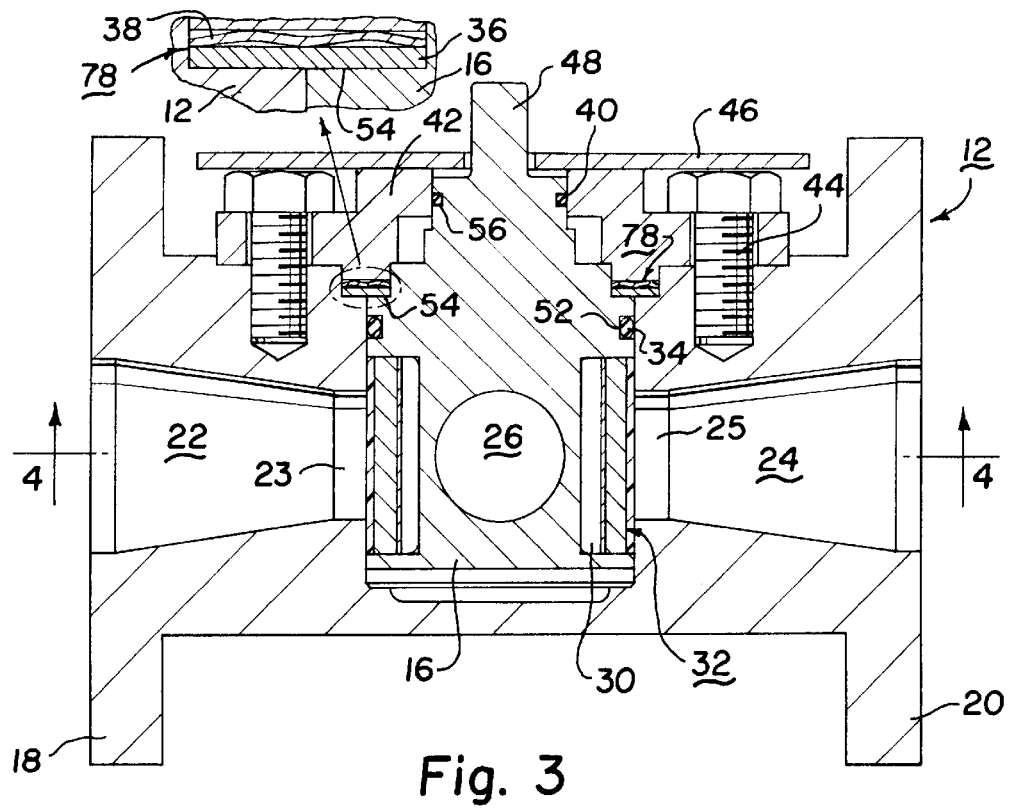
FIG. 3 is a sectional elevation view through the valve hereof.
Figure 4:
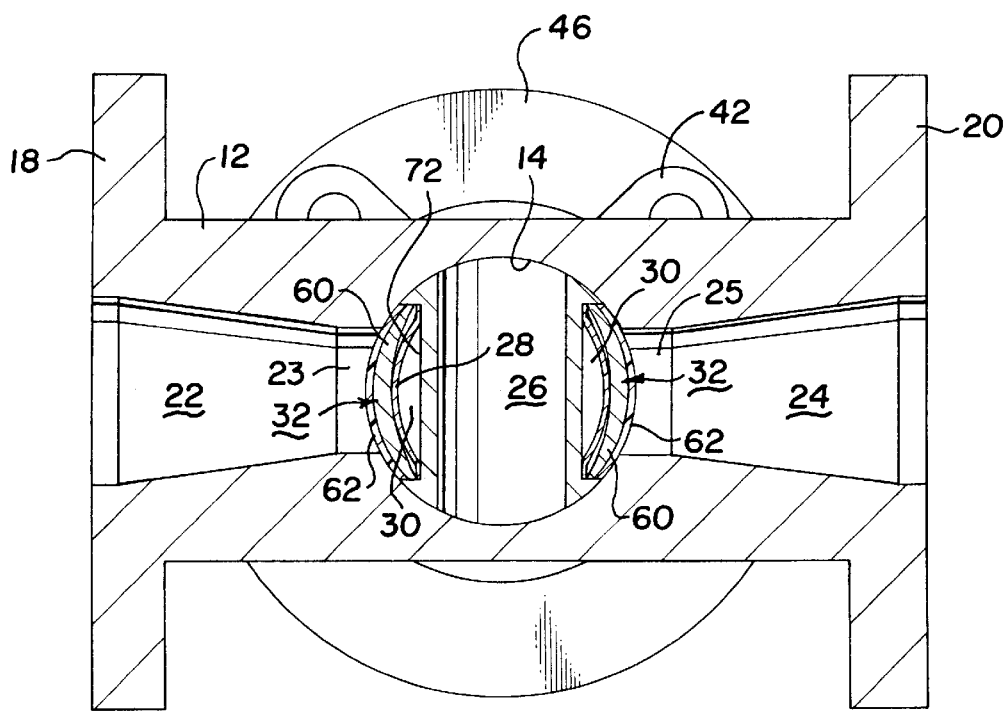
FIG. 4 is a sectional view as seen substantially along the lines 4—4 of FIG. 3.
Figure 5:
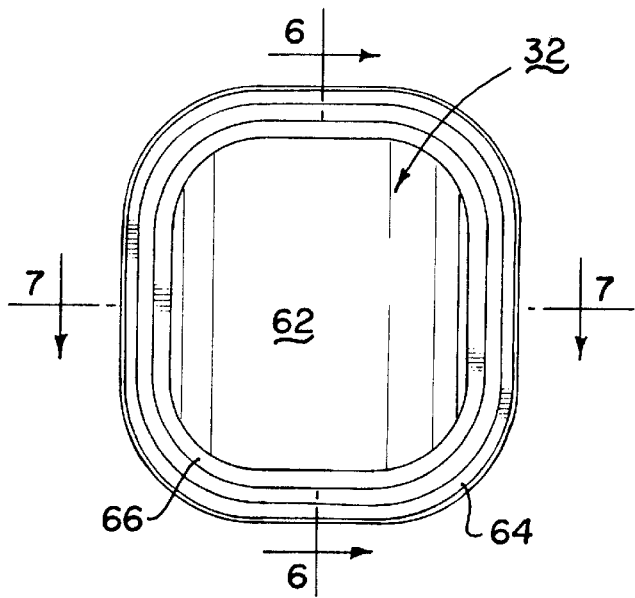
FIG. 5 is a rear elevation view of the valve seat pad utilized in the valve of FIG. 1.
Figure 6:
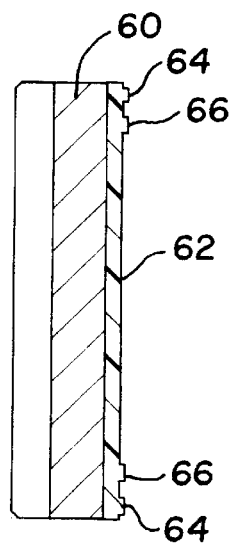
FIG. 6 is a sectional elevation as seen substantially along the lines 6—6 of FIG. 5.
Figure 7:
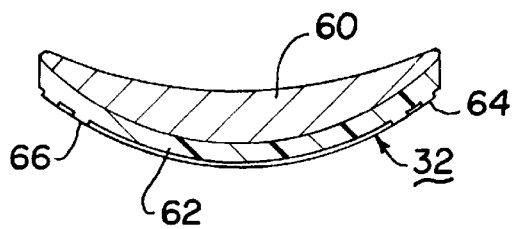
FIG. 7 is sectional plan view as seen substantially along the lines 7—7 of FIG. 5.
Figure 8:
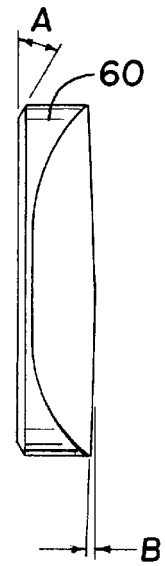
FIG. 8 is an elevation view of the seat pad utilized in the valve seat of FIG. 5.
Figure 9:
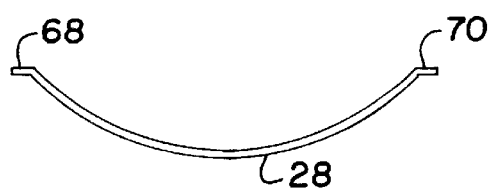
FIG. 9 is a plan view of the port seal spring.
Figure 10:
FIG. 10 is an enlarged sectional elevation of the fire seal ring as seen substantially along the lines 10—10 of FIG. 2.

Also contributing virtue to the valve hereof is the fire seal 78 effected intervening between body 12, plug 16 and cover plate 42 by friction ring 36 and fire seal ring 38 as best seen in FIG. 3A. It will be appreciated that as bolts 44 are tightened, a compression loading is imposed between the body and top plate compressing and expanding the corrugated or rippled fire seal ring 38 so as to consume any clearance in the gap spacing about shoulder 54. The effect thereof is to minimize or eliminate the ability of gas content to leak outward through the bonnet to atmosphere even following exposure to fire or other high temperature source. At the same time, any gas pressure applied to the valve stem urges the stem upward in the direction toward the top plate thereby enhancing the pressure loading between the stem and top plate and imposing an increased sealing squeeze against the fire seal ring. Friction ring 36 comprises a polymer incorporating a lubricant such as molybdenum disulphide. Use of the friction ring affords the benefit of minimizing if not eliminating a future need to lubricate the valve. That is, once the elastomer burns away from seat pads 32 a metal to metal seal is instantly created.

By the above description there is disclosed a novel gas distribution valve having a construction affording many virtues over similar type valves of the prior art. A reduced body size along with a cylindrical, (or elliptical) rather than a tapered plug, enables a smooth turbulent free thruput and a venturi flow path whereby the same or more flow can be achieved in a relatively smaller valve. The seat pads are supported in pockets formed in opposite surfaces of the plug 16 ninety degrees displaced from the axis of the thru-port 26. Construction of the seat pads is such as to provide rotational guidance to the plug while at the same time being urged outwardly against the wall surfaces of the plug well thereat to effect a positive seal against leakage in the closed position of the valve. In the event a fire is encountered which destroys the elastomer, a restrictive flow is still maintained by the spring force urging the seat into contact against the well surface thereby minimizing the possibility of leakage and continuing to render the valve substantially leakage free.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. A plug valve comprising:
    a body defining a flow passage including an inlet passage and an outlet passage;
    a vertically oriented cylindrical well located intermediate said flow passage separating said inlet and outlet passages and defining inlet and outlet passage openings thereat;
    an arcuately displaceable plug disposed within said well and defining a thru-port extending transversely therethrough of like configuration and size as said inlet and outlet passage openings;
    wrench engagement means secured to said plug and operable for arcuately displacing said plug between an open position in which the axis of said thru-port is in axial alignment and in communication with said inlet and outlet passage openings and a closed position in which the axis of said thru-port extends transversely to the axis of said inlet and outlet openings;
    pockets defined on opposite surfaces of said plug; and
    seals supported in the pockets of said plug for sealing the openings of said inlet and outlet passages when said plug is in said closed position; said seals having a radius on their inward surface and a biasing member housed by said seals and aligned in a parallel orientation with said plug, with said seals each comprising an arcuate metallic segment backed by a predetermined thickness of high tensile strength elastomer and with said biasing members each comprising an arcuate leaf spring extending concentrically about the axis of said plug and positioned in said pocket compressed intervening between an inner wall of said pocket and an inner face of said segment.

2. A plug valve in accordance with claim 1 in which the arcuate axis of said spring extends substantially parallel to the axis of said plug.

3. A plug valve in accordance with claim 2 in which said seals are dimensionally configured for a portion thereof to circumscribe said passage openings when said plug is in said closed position.

4. A plug valve in accordance with claim 3 in which the elastomer of said seals include a pair of parallel ribs exposed on the surface of said circumscribing portions.

5. A plug valve comprising:
 a body defining a flow passage including an inlet passage and an outlet passage;
 a vertically oriented cylindrical well located intermediate said flow passage separating said inlet and outlet passages and defining inlet and outlet passage openings thereat;
 an arcuately displaceable plug disposed within said well and defining a thru-port extending transversely therethrough of like configuration and size as said inlet and outlet passage openings;
 wrench engagement means secured to said plug and operable for arcuately displacing said plug between an open position in which the axis of said thru-port is in axial alignment and in communication with said inlet and outlet passage openings and a closed position in which the axis of said thru-port extends transversely to the axis of said inlet and outlet openings;
 seals supported on opposite surfaces of said plug for sealing the openings of said inlet and outlet passages when said plug is in said closed position, said seals having a radius on their inward surface and a biasing member housed by said seals and aligned in a parallel orientation with said plug;
 a cover plate attached to said body vertically securing said plug within said well; and
 a fire seal consisting essentially of a substantially thin disc like ring intervening between opposing surfaces of said cover plate and said plug contiguous at least to said cover plate and effective in the course of being exposed to a fire to restrict leakage of gas past said plug to outward past said cover plate.

6. A plug valve in accordance with claim 5 in which said fire seal ring is comprised of metal composition having a rippled surface contour that is compressed during assembly of said cover plate to said body.

7. A plug valve in accordance with claim 5 including a lubricated friction ring secured between said plug and said fire seal ring imposing a relatively low torque requirement for displacement of said plug.

8. A valve comprising:
 a body defining a flow passage including an inlet passage and an outlet passage;
 a vertically oriented cylindrical well located intermediate said flow passage separating said inlet and outlet passages and defining inlet and outlet passage openings thereat;
 a plug disposed within said well and defining a thru-port extending transversely therethrough;
 engagement means secured to said plug for arcuately displacing said plug between an open position in which the axis of said thru-port is in axial alignment and in communication with said inlet and outlet passage openings and a closed position in which the axis of said thru-port extends transversely to the axis of said inlet and outlet openings; and
 seals supported on opposite surfaces of said plug for sealing the openings of said inlet and outlet passages when said plug is in said closed position, said seals comprising an arcuate metallic segment backed by a predetermined thickness of high tensile strength elastomer and an arcuate leaf spring extending about an arcuate axis and compressed intervening between a wall of said plug and an inner face of said segment.

9. A plug valve in accordance with claim 8 in which the arcuate axis of said spring extends substantially parallel to the axis of said plug.

10. A plug valve in accordance with claim 9 in which said seals are dimensionally configured for a portion thereof to circumscribe said passage openings when said plug is in said closed position.

11. A plug valve in accordance with claim 10 in which the elastomer of said seals include a pair of parallel ribs exposed in the surface of said circumscribing portions.

12. A plug valve in accordance with claim 8 in which said plug defines pockets on opposite surfaces in which to receive said seals.

13. A plug valve in accordance with claim 8 including a cover plate attached to said body vertically securing said plug within said well and there is included a fire seal ring intervening between opposing surfaces of said cover plate and said plug and effective in the course of being exposed to a fire to restrict leakage of gas past said plug to outward past said cover plate.

14. A plug valve in accordance with claim 13 in which said fire seal ring is comprised of metal composition having a rippled surface contour that is compressed during assembly of said cover plate to said body.

15. A plug valve in accordance with claim 14 including a lubricated friction ring secured between said plug and said fire seal ring affording a relatively low torque requirement for displacement of said plug.

\* \* \* \* \*